T. R. TIMBY.
APPARATUS FOR MANUFACTURING SOLAR SALT.

No. 180,962. Patented Aug. 8, 1876.

WITNESSES
Chas J Gooch
A H Galt

INVENTOR
Theodore R Timby
By Knight Bros Attorneys

UNITED STATES PATENT OFFICE.

THEODORE R. TIMBY, OF TARRYTOWN, NEW YORK.

IMPROVEMENT IN APPARATUS FOR MANUFACTURING SOLAR SALT.

Specification forming part of Letters Patent No. 180,962, dated August 8, 1876; application filed June 30, 1876.

*To all whom it may concern:*

Be it known that I, THEODORE R. TIMBY, of Tarrytown, in the county of Westchester and State of New York, have invented a new and useful Improvement in Apparatus for Manufacturing Solar Salt, of which the following is a specification:

In the manufacture of what is termed "solar salt," as conducted prior to my present invention, the brine is exposed in vats to the direct action of the sun's rays and wind, and is covered by movable sheds during rains. The handling of these movable covers requires the constant employment of a large force of men, while the space occupied by them when removed from the vats is at least equal to the area utilized for evaporation; and after the salt-crystals form to a sufficient extent to cover the bottom of the vat, solar heat has very little if any effect, being repelled by the white surface. The only active evaporating agent then is the wind or atmosphere.

The present invention consists in a simple and inexpensive "hot cover," which is, as a whole, opaque, and always presents an upper surface of dark color, so as to absorb and apply the greatest amount of solar heat, while it utilizes also the wind and the heated air, and in itself provides the required shelter from rain, and also a protection against the entrance of dust and other impurities, as hereinafter set forth.

The objects thus accomplished are, first, the production of a greatly-increased yield of solar salt per day in a vat of given area; second, the accommodation of double the present number of vats of the same area in a given space; third, the reduction of the work of attendants to the operations of filling the vats with brine, and removing the salt; fourth, the production of solar salt of superior quality or purity.

Figure 1:
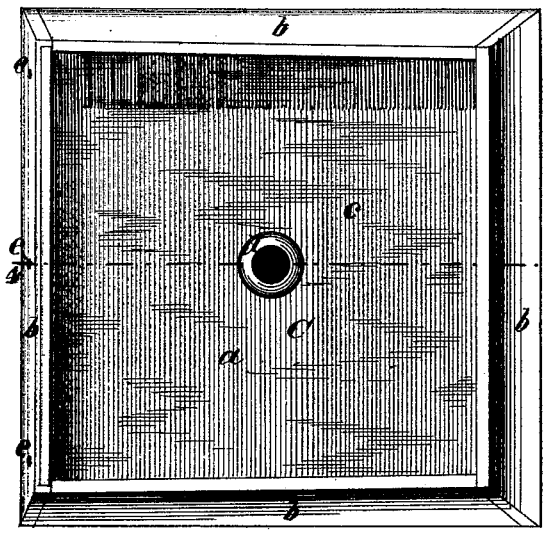
Figure 2:
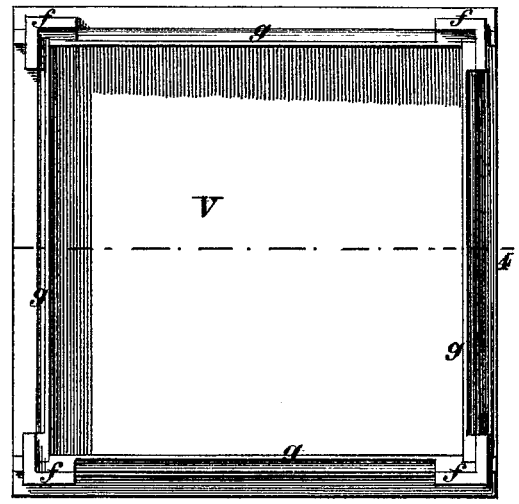
Figure 3:
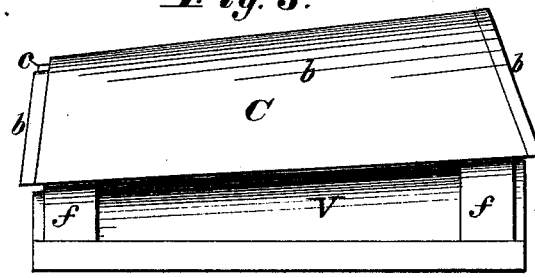
Figure 4:
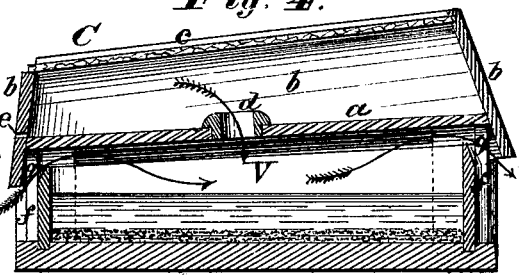
Figure 5:
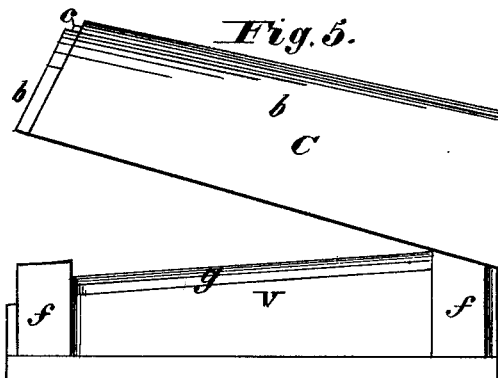
Figure 6:
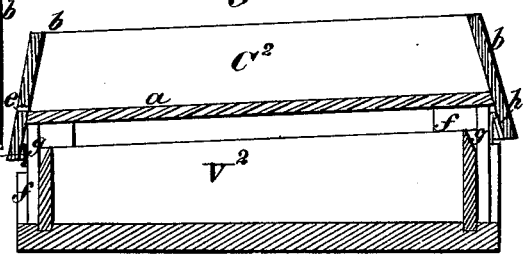

Figure 1 is a plan or top view of a covered salt-vat illustrating this invention. Fig. 2 is a top view of the vat uncovered. Fig. 3 is a side elevation of the covered vat. Fig. 4 represents a vertical section of the same, on the line 4 4, Figs. 1 and 2. Fig. 5 is a side view of the same, showing the cover lifted to give access to the vat. Fig. 6 represents a vertical section of another vat, illustrating certain modifications.

Like letters of reference indicate corresponding parts in the several figures.

V represents a horizontal vat, open at top, and adapted to hold brine; and C represents a "hot cover" for the same, so termed because it is designed primarily to augment the effect of solar heat, in the operation of evaporating the brine for the production of solar salt.

The cover proper, or what may be termed the "floor" of the hot cover, in the illustration, is constructed of opaque material, with an upper surface, $a$, of dark color, preferably black, so as to adapt it to absorb a large amount of solar heat. This it conducts directly downward to the brine through the intervening air, to a very large extent; but a portion of the heat is absorbed therefrom by the overlying atmosphere, and this quantity would be greatly increased if the wind should have access, so as to displace the heated air by its cooler currents. To prevent this, inclined sides $b$ have been applied to the cover, as represented, so as to deflect the wind upward away from said surface. To still further prevent the loss of heat through the surrounding atmosphere, a transparent top, $c$, of glass, has been used in combination with the close sides; and to utilize the highly-heated air from beneath this, an orifice, $d$, has been formed in the cover proper, through which said air can pass downward upon the surface of the brine.

To adapt the hot cover to serve also as a rain-guard, the grooved upper edges of the sides $b$, in which the glass $c$ is held, are inclined to the front of the vat sufficiently to cause the glass to shed the water that falls upon it. The top of the vat proper is also similarly inclined. Small escape-orifices $e$ are formed in the front side of the cover, and a guard-flange is formed around the air-passage $d$, to adapt the surface $a$ to act as a water-shed when the glass is broken and not in use.

To give entrance to the wind, and egress to air and displaced vapor beneath the cover, the vat V is constructed with corner posts $f$, extending above its sides, so as to elevate the cover somewhat. To direct the entering air upward against the hot bottom of the cover, and then downward upon the brine, the inclined sides *b* of the cover are extended to form overhanging edges; and the upper edges of the sides of the vat are beveled, as shown at *g*, to form passages of the required dimensions and direction.

The improved cover, it will be observed, is not removed when the sun shines, but then performs its primary function, as illustrated in Fig. 4. Besides this function and that of sheltering the brine from rain, the cover also operates to exclude dust and other impurities, and thus to insure the production of a superior quality of solar salt, while the absence of necessity for removing the cover renders practicable the covering of the entire area of available surface with vats, no space for removed covers being required; and the services of a large number of attendants can be dispensed with. The cover is elevated to give access to the interior of the vat, for filling the same or removing the salt, as shown in Fig. 5. The attachment of the cover to the vat by hinges *h* and hook-and-eye fastenings *i* is illustrated in Fig. 6. This figure illustrates, also, the omission from the cover of the glass top *c* and air-passage *d*, and of the inclination of the upper edges of the sides above described. Other modifications, consisting in the omission of one or more features of the invention, while the others are retained, will suggest themselves.

The vat and cover are intended to be substantially built of suitable wood, and of rectangular shape at bottom. Their proportions will vary. The structure of the vat proper, and the process of making solar salt, apart from the employment of a hot cover, as above described, form no part of this invention.

Having described this my invention, the following is what I claim as new, and desire to secure by Letters Patent, viz:

1. A vat cover having a slightly-inclined top or upper surface of dark color, to deflect the rain and absorb solar heat, and inclined overlapping sides, to deflect the wind and dust away from the surface of the brine, substantially as herein illustrated and described.

2. A vat-cover having an upper surface of dark color to absorb solar heat, and a transparent top and close sides for confining the air in immediate contact with said dark surface, substantially as herein described.

3. A combined hot cover and rain-guard, substantially as herein illustrated and set forth, the same having an upper surface of dark color to absorb solar heat, and sufficient inclination to shed water.

4. A vat-cover having overlapping sides, in combination with posts supporting it slightly above the bevel sides of the vat, whereby air is allowed to enter and impinge obliquely upon the lower surface of the hot cover, by which it is deflected upon the surface of the brine, substantially as set forth.

THEODORE R. TIMBY.

Witnesses:
JAS. L. EWIN,
ABNER C. THOMAS.